United States Patent
Kaskawitz et al.

(10) Patent No.: US 9,696,749 B2
(45) Date of Patent: Jul. 4, 2017

(54) CONTROL DEVICES, SYSTEMS, AND METHODS FOR SELF-PROPELLED MACHINERY

(71) Applicant: Honda Motor Co., Ltd, Tokyo (JP)

(72) Inventors: Scott Kaskawitz, Hillsborough, NC (US); Vincent Andrew Prinzo, Hillsborough, NC (US); Arvic Gutierrez Macapagal, Hillsborough, NC (US)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 13/901,787

(22) Filed: May 24, 2013

(65) Prior Publication Data

US 2014/0345416 A1 Nov. 27, 2014

(51) Int. Cl.
  *G05G 13/00* (2006.01)
  *A01D 34/68* (2006.01)

(52) U.S. Cl.
  CPC .............. *G05G 13/00* (2013.01); *A01D 34/68* (2013.01); *A01D 34/6812* (2013.01); *A01D 2034/6843* (2013.01); *Y10T 74/20384* (2015.01); *Y10T 74/20612* (2015.01)

(58) Field of Classification Search
  CPC ......... Y10T 74/20612; Y10T 74/20732; Y10T 74/20582; G05G 1/04; G05G 1/06; A01D 2034/6843; A01D 34/6812; A01D 34/6806; B62D 11/08; B62D 11/003
  See application file for complete search history.

(56) References Cited

U.S. PATENT DOCUMENTS

| 3,841,069 A | 10/1974 | Weck |
| 4,213,513 A | 7/1980 | Beck |
| 4,221,108 A | 9/1980 | Owens |
| 4,290,256 A | 9/1981 | Seifert |
| 4,309,862 A | 1/1982 | Carlson |
| 4,430,848 A | 2/1984 | Wistrom |

(Continued)

FOREIGN PATENT DOCUMENTS

| EP | 2025217 A1 | 2/2009 |
| EP | 2805597 | 11/2014 |
| EP | 2805597 | 4/2016 |

OTHER PUBLICATIONS

European Search Report for Application No. 14169273.1 dated Oct. 29, 2014.

(Continued)

*Primary Examiner* — Daniel Yabut
(74) *Attorney, Agent, or Firm* — Jenkins, Wilson, Taylor & Hunt, P.A.

(57) ABSTRACT

Control devices and systems for self-propelled machinery and related methods are disclosed. In one aspect, a control device for self-propelled machinery includes a central portion disposed between a first gripping portion and a second gripping portion and at least one pressure sensitive trigger control provided over either the first or the second gripping portion. The trigger control can be configured to reduce a speed of the self-propelled machinery by actuating a portion of a potentiometer for varying an electrical signal carried by the control device. In some aspects, the control device can electrically communicate with a control unit of the self-propelled machinery.

20 Claims, 9 Drawing Sheets

(56) References Cited

U.S. PATENT DOCUMENTS

| | | | |
|---|---|---|---|
| 4,476,643 A * | 10/1984 | Hilchey et al. | 37/245 |
| 4,696,150 A | 9/1987 | Geeck | |
| 4,738,084 A * | 4/1988 | Ogano et al. | 56/11.2 |
| 4,885,903 A | 12/1989 | Scag | |
| 4,991,382 A | 2/1991 | Scag | |
| 5,020,308 A | 6/1991 | Braun et al. | |
| 5,095,769 A | 3/1992 | Bowden | |
| 5,138,824 A | 8/1992 | Oshima et al. | |
| 5,155,985 A | 10/1992 | Oshima et al. | |
| 5,195,307 A | 3/1993 | Thorud et al. | |
| 5,203,147 A | 4/1993 | Long | |
| 5,261,214 A | 11/1993 | Wollershein | |
| 5,335,487 A | 8/1994 | Murakawa et al. | |
| 5,353,578 A | 10/1994 | Irby et al. | |
| 5,375,674 A | 12/1994 | Peter | |
| 5,377,774 A | 1/1995 | Lohr | |
| 5,651,241 A | 7/1997 | Wegner | |
| 5,657,669 A | 8/1997 | Barnard | |
| 5,680,748 A | 10/1997 | Barnard | |
| 5,692,366 A * | 12/1997 | Hardesty | 56/11.2 |
| 5,791,199 A | 8/1998 | Mitchell et al. | |
| 6,082,083 A | 7/2000 | Stalpes et al. | |
| 6,301,864 B1 | 10/2001 | Damie et al. | |
| 6,513,267 B2 | 2/2003 | Yoshida | |
| 6,550,161 B2 | 4/2003 | Hanafusa | |
| 6,622,464 B2 | 9/2003 | Goman et al. | |
| 6,734,647 B2 * | 5/2004 | Wakitani | A01D 34/006 318/139 |
| 6,751,936 B2 | 6/2004 | Kucera et al. | |
| 6,769,501 B2 | 8/2004 | Iida et al. | |
| 6,796,392 B2 | 9/2004 | Kobayashi et al. | |
| 6,945,133 B2 | 9/2005 | Rush et al. | |
| 6,948,299 B2 | 9/2005 | Osborne | |
| 6,951,092 B2 * | 10/2005 | Busboom et al. | 56/10.8 |
| 6,977,473 B2 | 12/2005 | Wakitani et al. | |
| 7,063,177 B1 | 6/2006 | Crumly | |
| 7,213,662 B2 | 5/2007 | Crumly | |
| 7,275,615 B2 | 10/2007 | Derby et al. | |
| 7,318,309 B2 | 1/2008 | Osborne | |
| 7,451,865 B2 | 11/2008 | Eavenson et al. | |
| 7,479,754 B2 | 1/2009 | Lucas et al. | |
| 7,482,768 B2 | 1/2009 | Lucas et al. | |
| 7,487,608 B2 | 2/2009 | Yamazaki et al. | |
| 7,523,600 B2 | 4/2009 | Sasaoka | |
| 7,540,102 B2 | 6/2009 | Olmr et al. | |
| 7,540,131 B2 | 6/2009 | Stover et al. | |
| 7,543,429 B2 | 6/2009 | Kaskawitz et al. | |
| 7,543,430 B2 | 6/2009 | Kaskawitz et al. | |
| 7,644,781 B2 | 1/2010 | Moriyama et al. | |
| 7,666,117 B2 | 2/2010 | Kawakami et al. | |
| 7,698,881 B2 | 4/2010 | McCane et al. | |
| 7,730,577 B2 | 6/2010 | Wood | |
| 7,744,503 B2 | 6/2010 | Kobayashi et al. | |
| 7,762,050 B1 | 7/2010 | Kaskawitz et al. | |
| 7,793,563 B2 | 9/2010 | Iguchi et al. | |
| 7,849,943 B1 | 12/2010 | Ragland | |
| 7,850,555 B2 | 12/2010 | Keane et al. | |
| 7,938,039 B2 | 5/2011 | Cox | |
| 8,079,433 B2 | 12/2011 | Teague et al. | |
| 8,312,946 B2 | 11/2012 | Lahey et al. | |
| 8,327,961 B2 | 12/2012 | Arpino | |
| 8,381,885 B2 | 2/2013 | Huibregtse | |
| 2002/0005001 A1 * | 1/2002 | Yoshida et al. | 37/266 |
| 2002/0053479 A1 * | 5/2002 | Wakitani | B60L 15/2036 180/315 |
| 2005/0144919 A1 | 7/2005 | Osborne | |
| 2005/0230158 A1 * | 10/2005 | Kanke | B62D 11/04 180/6.5 |
| 2006/0096791 A1 * | 5/2006 | Sueshige et al. | 180/6.48 |
| 2006/0150444 A1 * | 7/2006 | Friberg et al. | 37/244 |
| 2008/0021609 A1 | 1/2008 | Derby et al. | |
| 2008/0047246 A1 | 2/2008 | Osborne | |
| 2008/0086997 A1 | 4/2008 | Lucas et al. | |
| 2008/0120955 A1 | 5/2008 | Lucas et al. | |
| 2008/0284363 A1 | 11/2008 | Lucas et al. | |
| 2009/0159392 A1 * | 6/2009 | Vaughn et al. | 192/49 |
| 2009/0205226 A1 | 8/2009 | Olmr et al. | |
| 2009/0223191 A1 * | 9/2009 | Wilson | 56/11.7 |
| 2009/0223475 A1 | 9/2009 | Wilson et al. | |
| 2011/0108335 A1 | 5/2011 | Levander | |
| 2011/0126502 A1 | 6/2011 | Pitman et al. | |
| 2012/0241263 A1 | 9/2012 | Stover et al. | |
| 2013/0046448 A1 | 2/2013 | Fan et al. | |

OTHER PUBLICATIONS

Donoghue et al., "Extending Technology to Drive by Wire Control," 1994, pp. 386-394, Teledyne Electronic Systems, Northridge, California.

Smith et al., "An Outdoor High-Accuracy Local Positioning System for an Autonomous Robotic Golf Greens Mower," 2012 IEEE International Conference on Robotics and Automation, May 14-18, 2012, pp. 2633-2639, RiverCentre, Saint Paul, Minnesota, USA.

European Intent to Grant for Application No. 14 169 273.1 dated Oct. 15, 2015.

Decision to Grant for Application No. 14169273.1 dated Mar. 10, 2016.

* cited by examiner

CONTROL DEVICES, SYSTEMS, AND METHODS FOR SELF-PROPELLED MACHINERY

TECHNICAL FIELD

The present subject matter generally relates to self-propelled machinery and related methods and, more particularly, to control devices, systems, and related methods of driving a lawn mower.

BACKGROUND

Self-propelled machines such as lawn mowing machines, snow throwing or snow blowing machines, tillers, and the like, often provide handles on which controls are mounted for manipulation by operators or users of such machines. Conventional "walk behind" types of self-propelled machines typically have a handle extending behind a main operative assembly of the machine for gripping by the operator as the operator walks behind the machine during movement thereof in a forward direction. Typically, one or more controls are mounted on the handle for the user to manipulate while gripping the handle and operating the machine. Currently, it is not possible to lower the stroke, load, and/or set the speed of the machine via such controls. In addition, recent marketing research indicates that many consumers of self-propelled machines would prefer more intuitive and user-friendly control mechanisms in order to simplify use of the machines.

A need exists therefore for centralized controls that are intuitive, easy to manipulate, and easy to reach. A need also exists for a more comfortable handle utilizing such centralized controls. Further needs exist for the ability to slow and/or stop forward motion via easily manipulated "drive-by-wire" electric controls having an improved location and/or position with respect to the handle.

SUMMARY

In accordance with this disclosure, control device, systems, and related methods for use and control of self-propelled machinery are provided. In some aspects, devices, systems, and methods described herein provide improved control over self-propelled machinery, easier speed changes in self-propelled machinery, improved comfort during operation of self-propelled machinery and lower operator fatigue. Such control devices and systems can be ergonomic, easy to understand, and easy to manipulate controls allowing for simplified one-handed operation of the self-propelled machinery.

These and other objects of the present disclosure as can become apparent from the disclosure herein are achieved, at least in whole or in part, by the subject matter disclosed herein.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
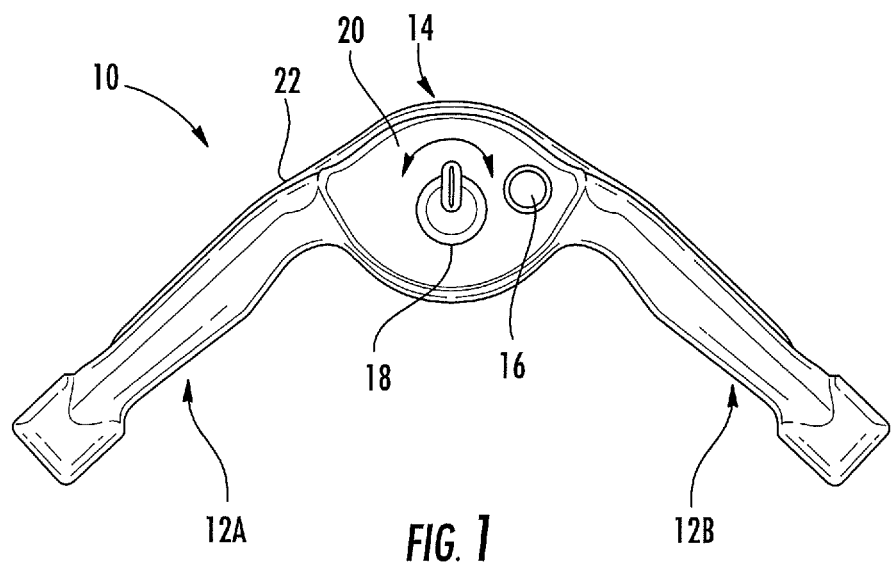
FIG. 1 is a top plan view illustrating a control device for self-propelled machinery according to one aspect of the subject matter described herein.

The present subject matter provides and/or includes control devices, systems, and related methods for controlling the speed and/or forward motion of self-propelled machinery, such as lawn mowers, snow throwers, tillers, delivery carts, lifts, floor scrubbers, and the like. In some aspects, such control devices, systems, and related methods can comprise electric controls such as a push button start for starting the engine of the machinery and/or one or more potentiometers for setting, slowing, and/or stopping forward motion of the machinery. The use and control of self-propelled machinery via electric controls, such as one or more potentiometers, provides advantageous and unexpected results including easier speed changes of the machinery, improved one-handed control over the machinery, improved comfort, lower operator fatigue, and/or improved ease-of-operation of the self-propelled machinery.

In some aspects, control devices, systems, and methods described herein can be used with machinery having a hybrid motor or engine, including a gas motor and an electric transmission. In some aspects, controls, systems, and methods described herein can control aspects of the electric transmission, which can transmit power to one or more wheels of the self-propelled machinery. In some aspects, controls, systems, and methods described herein can comprise electric controls configured to start and/or control aspects of the electric transmission.

In some aspects, controls, systems, and methods described herein can comprise one or more pressure sensitive controls which can be engaged during or as an operator steers the self-propelled machinery. In some aspects, the pressure sensitive controls can be disposed over gripping portions of the control device or system, thereby allowing one-handed (e.g., single handed) control over and/or operation of the self-propelled machinery.

In some aspects, controls, systems, and methods described herein can comprise a first pressure sensitive control engaged to start the transmission (e.g., push button start) of the self-propelled machinery, a rotatable control for setting a maximum speed, and one or more other pressure sensitive controls for slowing and/or stopping the self-propelled machinery. In some aspects, one or more of the pressure sensitive controls can comprise a potentiometer adapted to electrically communicate with the transmission. In some aspects, the rotatable control can comprise a potentiometer adapted to electrically communicate with the transmission.

In some aspects, the one or more electric controls can electrically communicate with the transmission via an electric control unit. The electrical control unit can comprise an electrical device configured to provide operational sequencing for a hybrid engine. In some aspects, the subject matter described herein may be implemented in software in combination with hardware and/or firmware. For example, the subject matter described herein may be implemented in software executed by a processor (e.g., a hardware-based processor), microprocessor, and/or microcontroller of electric control unit. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, logic devices, logic transistors, chip memory devices, programmable logic devices, such as field programmable gate arrays, and application specific integrated circuits. In addition, a computer readable medium that implements the subject matter described herein may be located on a single device or computing platform or may be distributed across multiple devices or multiple computing platforms.

As used herein, the terms "controller", and/or "control unit" refer to software in combination with hardware and/or firmware for implementing features described herein. In some embodiments, a controller may include a microprocessor, a processor, or a microcontroller.

As used herein, the term "potentiometer" can comprise any device adapted to vary resistance, voltage, or current within a circuit. Potentiometers can have three terminals or contacts. Two terminals can comprise end terminals and at least one other terminal (e.g., the wiper) can be movable to vary resistance as is measured with respect to it and either one of the end terminals.

Aspects of the present subject matter now will be described more fully hereinafter with reference to the accompanying drawings, in which some aspects of the present subject matter are shown. This present subject matter may, however, be embodied in many different forms and should not be construed as limited to the embodiments set forth herein. Rather, these aspects and/or embodiments are provided so that this disclosure will be thorough and complete, and will fully convey the scope of the present subject matter to those skilled in the art. Like numbers refer to like elements throughout.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the package or component in addition to the orientation depicted in the figures. For example, if the package or component in the figures is turned over, structure or portion described as "above" other structures or portions would now be oriented "below" the other structures or portions. Likewise, if the package or component in the figures are rotated along an axis, structure or portion described as "above", other structures or portions would be oriented "next to" or "left of" the other structures or portions.

Unless the absence of one or more elements is specifically recited, the terms "comprising", including", and "having" as used herein should be interpreted as open-ended terms that do not preclude the presence of one or more elements.

FIG. 1 is a top plan view of one embodiment of a control device generally designated 10, for use with self-propelled machinery such as a lawn mower, snow thrower, tiller, and the like. In some aspects, control device 10 can comprise a distal end portion of a handle that extends behind a main operative assembly of the self-propelled machinery. In some aspects, control device 10 can comprise one or more grips or gripping portions of a handle to which an operator can grasp while walking behind the machine during movement thereof. Additionally, control device 10 can advantageously comprise one or more controls for activating and/or controlling one or more engines of the machinery, and/or for controlling a speed and/or motion thereof. Notably, the one or more controls can be intuitive and/or easily reachable from the one or more gripping portions. Control device 10 can advantageously provide for one-handed control and steering of the self-propelled machinery.

In some aspects, control device 10 can comprise a handle, or portion thereof, having a first gripping portion or a first leg, generally designated 12A, a second gripping portion or second leg, generally designated 12B, and a central portion, generally designated 14 disposed therebetween. In some aspects, first leg 12A can be spaced apart from and angled with respect to second leg 12B. This can advantageously improve the ergonomic and aesthetic aspects of device 10. That is, angled gripping portions may be more comfortable and have a more natural feel to the operator. First leg 12A can be disposed at an acute angle (e.g., less than 90°), an obtuse angle (e.g., greater than 90°), or approximately orthogonal with respect to second leg 12B. In some aspects, first and second legs 12A and 12B can be provided in a substantially V-shape or V-shaped formation.

Figure 2:
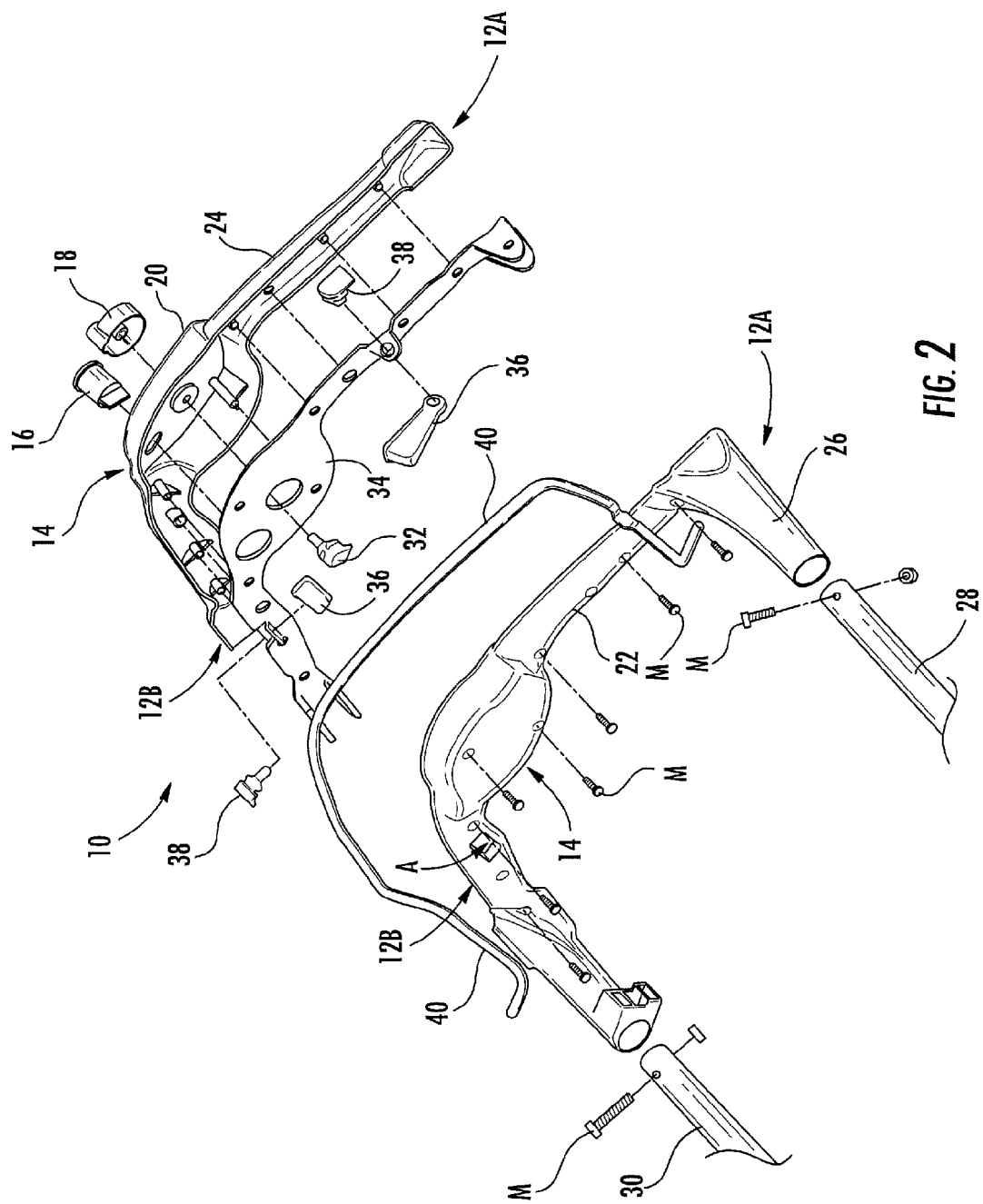
FIG. 2 is an exploded perspective view illustrating a control device and/or a portion of a control system for self-propelled machinery according to one aspect of the subject matter described herein.

In some aspects, one or more controls can be disposed on central portion 14 and/or on legs 12A and 12B. Such controls can advantageously be centralized with respect to the operator, and easily reachable from first and second legs 12A and 12B. For example and in some aspects, central portion 14 can comprise a pressure-sensitive or "push" control, such as a push button start 16, and a second rotatable control, such as a knob setting 18 or dial disposed thereon. In some aspects, push button start 16 and setting 18 can be disposed on a first surface or side 20 of device 10. One or more controls can also be disposed on an opposing second surface or side 22 of device as illustrated in FIG. 2. In some aspects, setting 18 comprises a speed setting, whereby an operator can set a maximum speed of the self-propelled machinery.

In some aspects, push button start 16 and setting 18 can comprise electric controls having an electrical aspect as opposed to purely mechanical controls. That is, in some aspects, push button start 16 and setting 18 can electrically communicate to a centralized control unit (see e.g., FIG. 4) for controlling portions of a gas, electric, and/or hybrid engine to increase speed, decrease speed, set and hold (e.g., maintain) speed, and/or altogether stop forward motion of the machinery. In some aspects, push button start 16 and setting 18 can electrically communicate with control unit (FIG. 4) via transmitting electrical pulses and/or electrical signals transmitted across one or more physical or electrical interfaces (not shown) of control unit. In some aspects, electrical signal carried via device 10 can be directly or indirectly communicated via one or more electrically conductive wires (not shown) to a control unit of the self-propelled machinery.

As the double-sided arrow in FIG. 1 illustrates, in some aspects setting 18 can comprise a dial that can be rotated or moved clockwise and/or counterclockwise with respect to legs, operator, and/or central portion 14 of device 10 for setting a maximum speed. That is, a maximum speed associated with the forward motion of the machinery can be easily controlled by manipulating or physically adjusting setting 18. In some aspects, speed of the machinery can be selectively adjusted by an operator (e.g., to a higher or lower maximum speed) simply by twisting or rotating one or more portions of speed setting 18. In some aspects, speed setting 18 comprises an intuitive speed setting dial, which is easy to understand and not overly complex. A maximum speed can be intuitively increased by rotating setting 18 clockwise and intuitively decreased by rotating setting 18 counterclockwise with respect to central portion 14. Such intuitive, easily manipulated, and easily reachable (e.g., centralized with respect to the operator) controls can advantageously allow machinery incorporating device 10 to be used, operated, and, therefore, purchased by larger portions of the general population, including elderly consumers.

FIG. 2 is a side perspective and exploded view of control device 10. Control device 10 can comprise comfortable and ergonomic gripping portions, whereby an operator can steer the machinery. Ergonomic gripping portions or legs (12A and 12B) can be coupled to a centralized control area from which an operator can set and control a speed, increase or decrease speed, and/or start and stop the engine of the machinery. In some aspects, control device 10 can comprise a first, rear cover 24 and a second, front cover 26. Rear cover 24 and front cover 26 can be physically coupled together via one or more mechanical fasteners M to form first and second legs 12A and 12B, respectively, and central portion 14. In some aspects, mechanical fasteners can comprise screws, however, any fastener, including pins, clips, and/or hooks, can be provided.

In some aspects, device 10 can be affixed to elongated first and second handles 28 and 30 extending between device 10 and a main operative assembly of the self-propelled machinery. In some aspects, first and second handles 28 and 30 can comprise hollow pipes configured to house electrical wires or other electrical components (not shown) configured to communicate electrical pulses or signals from controls (e.g., push button start 16 and setting 18) to an electrical control unit (FIG. 4) for controlling aspects of the self-machinery, including speed (e.g., speed of one or more wheels). In some aspects, device 10 can be attached to first and second handles 28 and 30 of a walk behind machine, such as a lawn mower, via mechanical fasteners M. Mechanical fasteners M can include one or more screws, pins, bolts, and/or one or more nuts affixed thereto. In some aspects, first and second handles 28 and 30 can be coupled to a rear portion of a lawn mower deck via any suitable means, and can extend upwardly therefrom at an angle appropriate for providing device 10 at a comfortable position for grasping and manipulation by an operator. In some aspects, the position at which device 10 is located is adjustable, so as to be even more comfortable to an operator thereof.

Notably, in some aspects setting 18 comprises a first potentiometer 32 configured for setting a maximum speed of the mower. That is, in some aspects, rotation of setting 18 can be configured to actuate or engage first potentiometer 32 thereby varying a resistance, voltage, or current associated with an electrical signal. First potentiometer 32 can electrically communicate with a controller or control unit (FIG. 4), which can be used to control a maximum amount of power transmitted to wheels of the self-propelled machinery. In some aspects, the maximum amount of power transmitted to the wheels of the self-propelled machinery can correspond to a maximum speed of the machine. In some aspects, the controller or control unit (FIG. 4) can electrically communicate with an electric transmission, which can deliver drive power to one or more wheels of the self-propelled machinery. In some aspects, the voltage or resistance of an electrical current supplied to a controller or control unit via a potentiometer, for example, first potentiometer 32 can be controlled by turning of a dial or knob setting (e.g., setting 18) which can correspond to a maximum speed to be set and maintained. In some aspects, setting 18 and potentiometer 32 can be mechanically connected such that turning setting 18 can move at least one contact or terminal of potentiometer 32, thereby varying resistance or voltage of the electrical current. An inner frame 34 or frame portion of device 10 can be used to support and hold portions of electrical controls between rear and front covers 24 and 26, respectively.

Device 10 can further comprise one or more controls disposed on a second side 22 of device 10, portions of which can be supported and held via frame 34. In some aspects, one or more pressure sensitive controls can be provided on a second side 22 of device 10, wherein an operator of self-propelled machinery can control further aspects of the machine by applying pressure to the controls. In some aspects, device 10 can comprise one or more pressure-sensitive or "squeezable" trigger controls 36. In some aspects, trigger controls 36 can be configured to adjust a speed of the self-propelled machinery. That is, the forward motion of the machine can be slowed and/or stopped via applying pressure to one or more trigger controls 36, for example, by squeezing trigger control against gripping portions of device 10.

In some aspects, trigger controls 36 can connect with and extend through portions of frame 34. Trigger controls 36 can also extend through openings or apertures A of second side 22 of front cover 26 allowing controls 36 to be easily manipulated while gripping first and/or second legs 12A and 12B. Notably, the self-propelled machinery can be slowed and/or stopped by squeezing just one trigger control 36 disposed on either side of device 10 thereby providing easy, simple, one-handed operation of the machinery. This can contribute to prolonged energy and/or decreased fatigue of operators of self-propelled machinery described herein.

Notably, each trigger control 36 can be adapted to actuate and/or engage a second potentiometer 38. In some aspects, each trigger control 36 can be used to vary a resistance an electrical signal sent to a controller via a respective second potentiometer 38. Pressing trigger controls 36 can actuate or move at least one contact or terminal of each potentiometer 38 mechanically connected thereto, thereby varying resistance or voltage of resultant electrical current carried by device 10. Second potentiometers 38 can be used to slow or stop forward motion of the self-propelled machinery by varying the voltage or resistance of an electrical current supplied to a controller. Notably, device 10 can comprise multiple electric controls, including at least one rotatable control, at least one pressure sensitive (i.e., trigger) control, and at least one push control. Device 10 can advantageously provide intuitive functional controls for improving ease-of-operation and enabling easy speed changes. Device 10 can enhance self-propelled machinery by allowing one handed operation, lowering operator fatigue, and improving the ease at which the machine can be turned or directed during operation.

Still referring to FIG. 2, device 10 can further comprise a lever 40. In some aspects, lever 40 can comprise a brake lever which can be pulled, pivoted, and/or otherwise moved to release and/or activate a brake. In some aspects, lever 40 can be configured to pivot about portions of device 10 and rotate, thereby pulling a brake cable. In some aspects, lever 40 can comprise a cable or non-cable component that can be adapted to transfer a force or actuation to a brake via translation and/or a change in tension.

Figure 3:
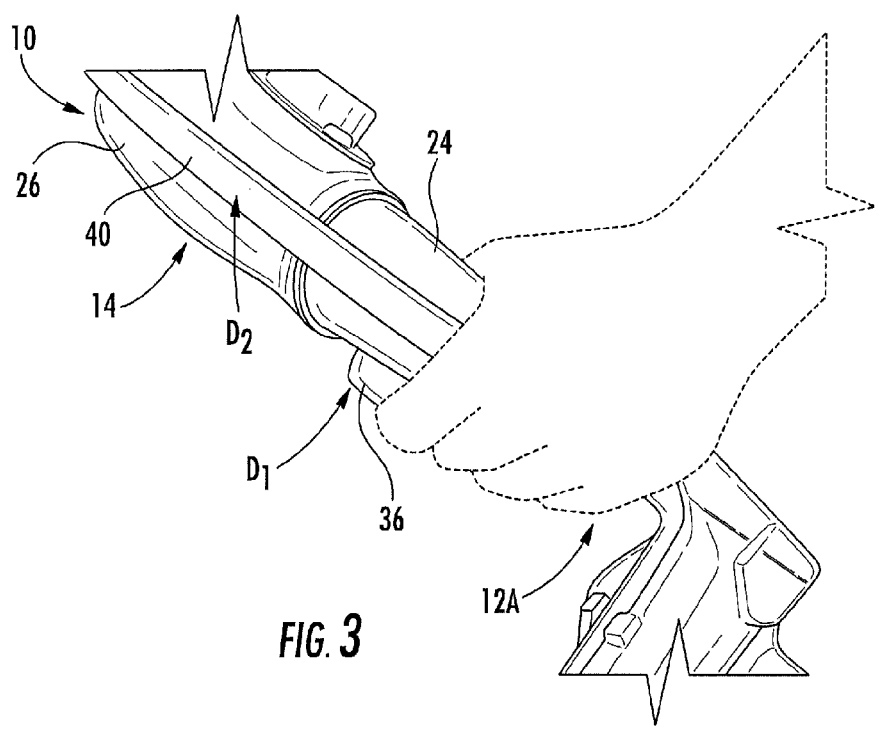
FIG. 3 is a side perspective view illustrating a control device and/or a portion of a control system for self-propelled machinery according to one aspect of the subject matter described herein.

Referring now to FIG. 3, a perspective side view of control device 10 during operation of self-propelled machinery is illustrated. As FIG. 3 illustrates, an operator can physically manipulate one or more electric controls while gripping at least one leg portion (e.g., 12A) of device 10. For example and in some aspects, an operator can apply pressure to trigger controls 36 while gripping one or both leg portions, for example, by wrapping fingers around at least first leg portion 12A and squeezing trigger control 36. The trigger control 36 can be squeezed inwardly towards rear cover 24 of device 10 in the direction D1. During operation, lever 40 can be pulled upwardly towards rear cover 24 of device 10 and pivot about portions of front cover 26 as shown. In some aspects, pulling lever 40 in a direction D2 towards rear cover 24 can release the brake. Notably, an operator can easily control the speed of the machinery via squeezing either one or both electric trigger controls 36 while gripping and steering the walk behind machine. Control device 10 can advantageously provide one-handed operation of self-propelled machinery.

Figure 4:
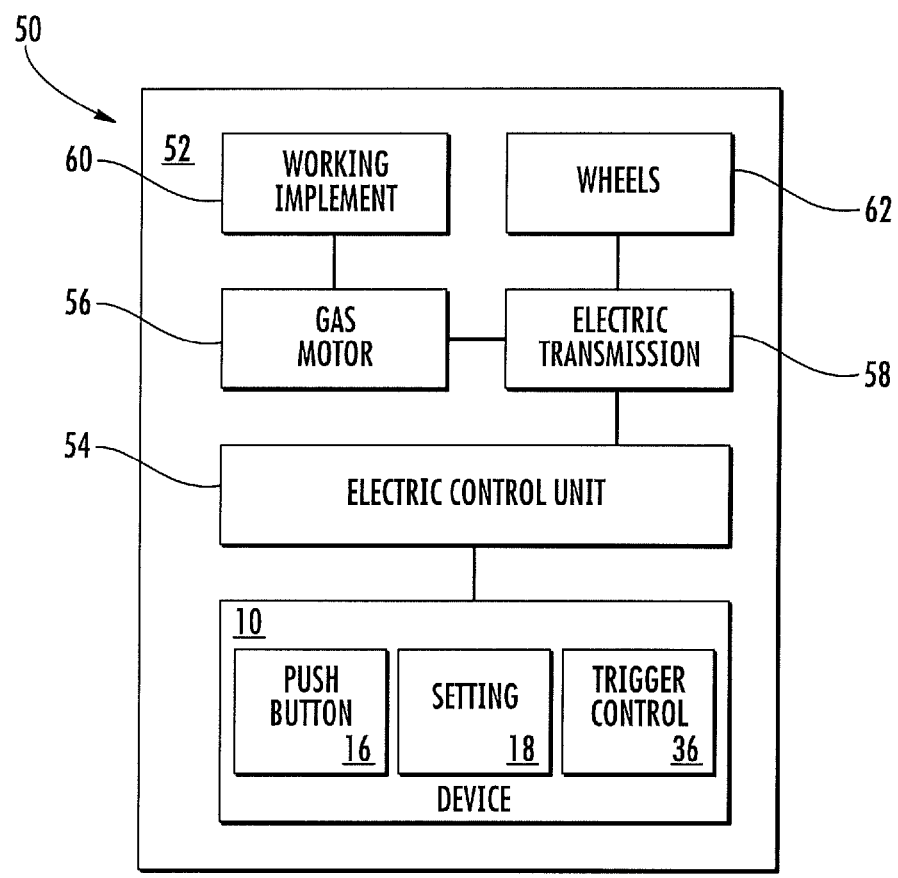
FIG. 4 is a block diagram illustrating a control system for self-propelled machinery according to one aspect of the subject matter described herein.

FIG. 4 is a block diagram of a control system, generally designated 50, for controlling aspects of self-propelled machinery 52, such as a lawn mower. Machinery 52 can comprise a control device 10, as described hereinabove, which can be electrically connected to and/or electrically communicate with an electric control unit 54 or controller. Control device 10 can electrically communicate with electric control unit 54 via one or more interfaces (not shown), which in turn can communicate with and/or control aspects of an electric transmission 58. In some aspects, electric transmission 58 can be powered via a gas motor 56 using an actuator or generator. In some aspects, machinery 52 can comprise a hybrid engine having both an electric transmission 58 and a gas motor 56. Gas motor 56 can be adapted to directly power a working implement 60, such as a lawn mower blade (e.g., or a tilling blade, snow throwing implement, floor scrubber, etc.) and electric transmission 58. Electric transmission 58 can be adapted to transfer and/or supply power directly to one or more wheels 62 of the machinery 52. Notably, one or more electric controls of device 10 can be used to set, adjust, and/or control the speed at which one or more wheels 62 operate. In some aspects, the speed at which one or more wheels 62 operate can be selectively controlled and varied during operation of machinery 52 via applying pressure to one or more trigger controls 36 while gripping one or more leg portions (e.g., 12A, 12B, FIGS. 1 and 2) of control device 10 or control handle.

In some aspects, gas motor 56 can be configured to transfer power to and drive one or more wheels 62 via transmission 58 in any suitable manner, thereby rendering machinery 52 self-propelled in response to control by an operator. In some aspects, machinery 52 can comprise many different types and/or structures self-propelled machinery, such as lawn mowers, in addition to those described hereinabove which are known to persons skilled in the art, and therefore are not further described. Electric transmission 58 can comprise a variable-speed electric transmission, and in some aspects can comprise a continuously variable-speed transmission. An operator can control the output speed of a continuously variable-speed electric transmission 58, and thus the speed of one or more driving wheels 62, over a continuous or substantially continuous range between a zero, or minimal speed and a maximum speed established via setting 18. In some aspects, more than one trigger control 36 can be configured to electrically communicate to control unit 54 via a respective potentiometer. In some aspects, control unit 54 can be configured to interpret a variation in signals as an incremental decrease in speed.

In some aspects, control unit 54 can be further configured to receive electrical input or signals from an ignition control and a rotatable dial for setting a maximum speed, such as push button start 16 and setting 18, respectively. In some aspects, push button start 16 can comprise an electrical ignition control configured to communicate to control unit 54 an operator's instruction that the engine (e.g., comprising motor 56 and transmission 58) is to be started. In some aspects, setting 18 can send signals to control unit 54 via a potentiometer. Control unit 54 can be configured to interpret variation in signals as a set maximum speed. Control unit 54 can further be configured, for example, to enable an operator to start or stop movement of working implement 60 (e.g., rotation of a mower blade) by instructing transmission 58 to open or close an interface clutch via control device 10. Upon pushing push button start 16, control unit 54 can receive a signal to activate gas motor 56 and transmission 58, and, therefore, working implement 60 and wheels 62 thereby allowing machinery 52 to be propelled using the power generated by gas motor 56 as transferred by transmission 58.

Figure 5:
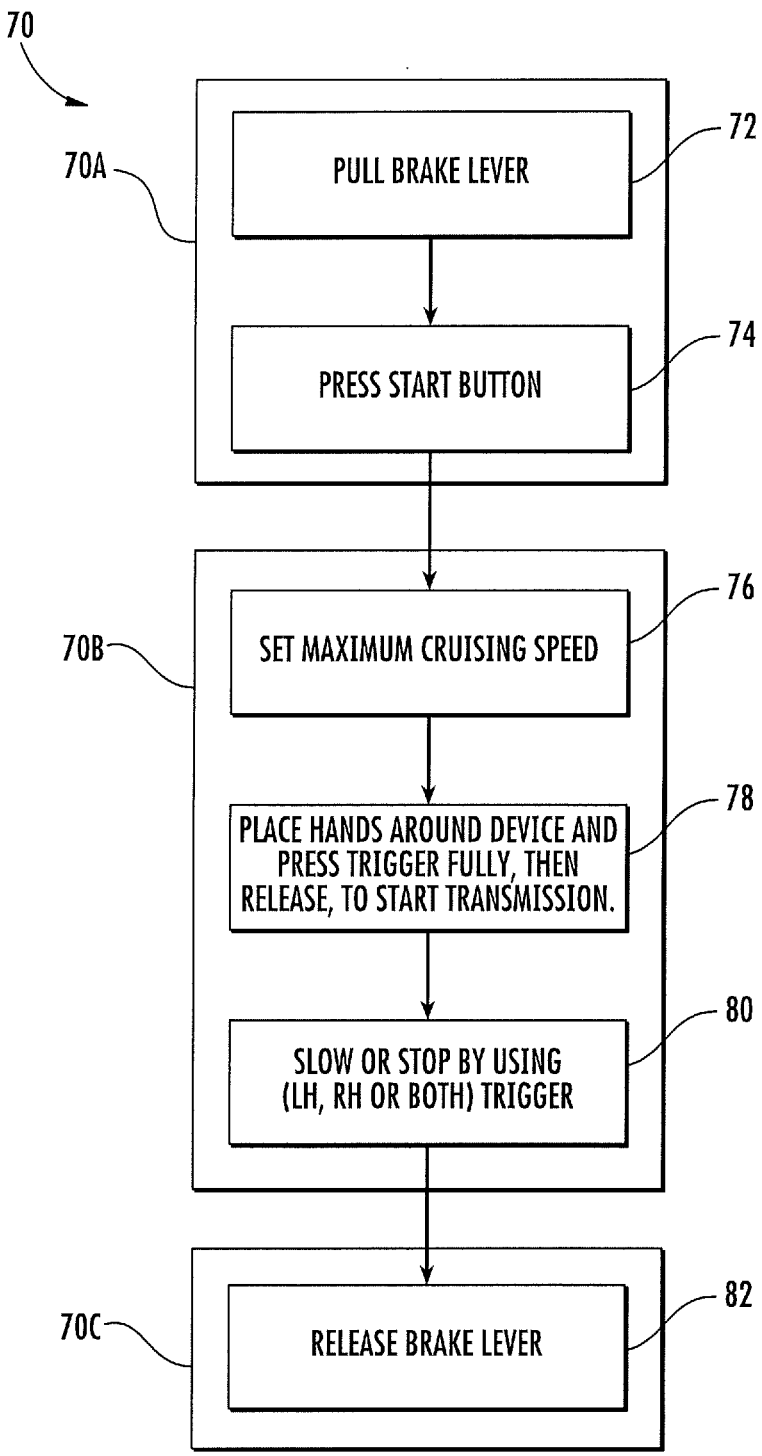
FIG. 5 is a flow chart illustrating an exemplary process for controlling self-propelled machinery via control devices and/or systems according to aspects of the subject matter described herein.

FIG. 5 is a flow chart illustrating an exemplary method, generally designated 70, for controlling aspects of self-propelled machinery via control devices and systems described hereinabove. In some aspects, the method can consist of a starting phase 70A, a driving phase 70B, and a stopping phase 70C. In some aspects, the starting phase 70A can comprise pulling the brake lever as illustrated at block 72. In some aspects, the lever can be pulled back towards a rear cover of a control device to release a brake as described hereinabove. Pulling the brake lever towards a central portion of control device can release the brake and prepare the machine for the driving phase. As block 74 illustrates, the operator can press the start button (e.g., push button start 16, FIG. 1) to start the engine of the machinery, which can include starting a gas motor and powering an electric transmission. Notably, the start button can comprise an electric device adapted to electrically communicate with a control unit for controlling aspects of the engine via the electric transmission.

Blocks 76, 78, and 80 illustrate aspects of driving phase 70B. At block 76, an operator can set a maximum cruising speed using an electric control (e.g., setting 18, FIG. 1) disposed on control device 10 (FIGS. 1-4). In some aspects, a maximum cruising speed can be intuitively set via rotating a dial or knob (e.g. setting 18) clockwise and/or counterclockwise over control device 10 (FIGS. 1-4). In some aspects, the maximum cruising speed can be set using electric signals communicated from a first potentiometer (32, FIG. 2) to a control unit (54, FIG. 4).

As illustrated in block 78, the operator can place hands around the control device (e.g., 10, FIGS. 1-4) and apply pressure via squeezing, pressing, and/or pulling back on one or both trigger controls (e.g., 36, FIGS. 2-4) fully and then releasing the same to start the electric transmission (e.g., 56, FIG. 4). Starting the transmission can transmit power to one or more wheels of the self-propelled machinery. The wheels can gradually propel the machinery to the maximum speed set at block 76.

At block 80, an operator can use electric controls to slow or stop the machinery via electrically communicating the desire to slow or stop to the electric transmission (e.g., 56, FIG. 4) via applying subsequent pressure to trigger controls. In some aspects, the one or more wheels can be slowed or stopped via using trigger controls (e.g., 36, FIGS. 1-4). An electric control unit (e.g., 54, FIG. 4) can receive signals from trigger controls via one or more potentiometers associated with each trigger control, and can incrementally increase or decrease speed a given amount upon interpretation of signals from potentiometer(s).

At block 82, the machine can be stopped via stopping the engine (e.g., motor and transmission). In some aspects, releasing the brake lever (e.g., 40 FIGS. 2, 3) from the control device can engage the brake and turn off the motor. Thus, releasing the brake lever (e.g., 40, FIGS. 2, 3) can indicate the desire to stop the machinery, and disengage the working implement (e.g., cutting blade, tilling blade, etc.) and discontinue propelling the one or more wheels.

Figure 6:
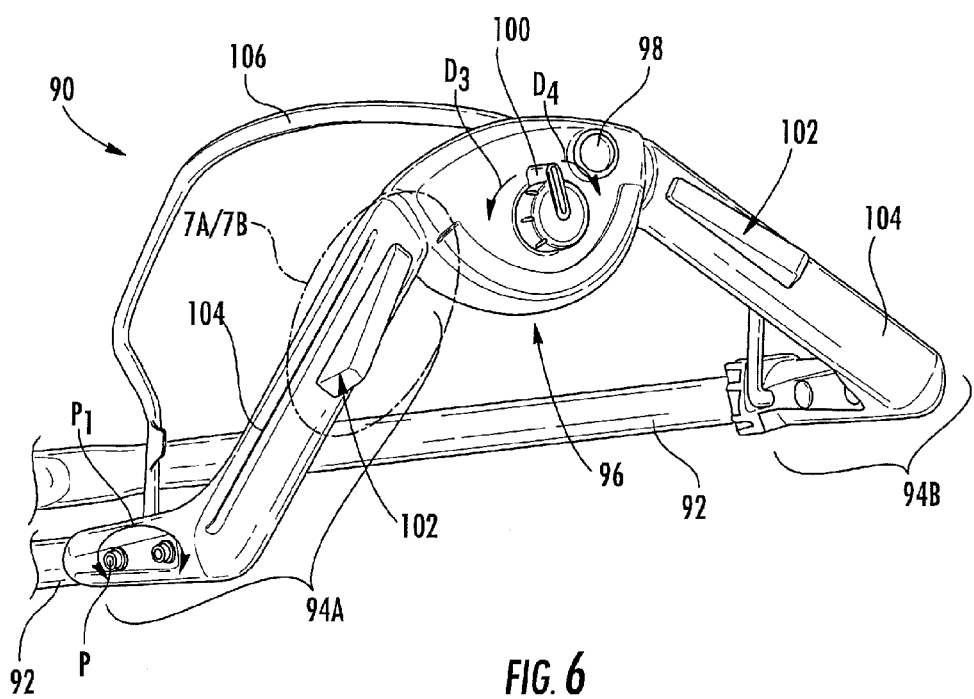
FIG. 6 is a top perspective view illustrating a control device and/or a portion of a control system for self-propelled machinery according to one aspect of the subject matter described herein.

FIG. 6 is a top perspective view of a further embodiment of a control device, generally designated 90. Control device 90 can be used within a control system for sending electrical pulses or signals to an electrical control unit (e.g., FIG. 4) and transmission. In some aspects, control device 90 can be used to control various aspects of self-propelled machinery, such as a lawn mower, snow thrower, tiller, and the like. In some aspects, control device 90 can be disposed at a distal end portion of one or more handles 92 that extend distally away from a main operative assembly (e.g., a mower deck) of the self-propelled machinery (not shown). In some aspects, control device 90 can comprise a handle, or portion thereof, having one or more grips or gripping portions to which an operator can grasp while walking behind the machine during movement thereof.

Control device 90 can further comprise one or more controls adapted to electrically activate and/or control an engine of the machinery, or portions thereof, and/or for controlling a speed and/or motion thereof. Notably, the one or more controls can be electric and centralized with respect to the operator and/or control device 90. In some aspects, the one or more controls can be disposed over the one or more gripping portions of control device 90, and can comprise intuitive, easy to reach controls with respect to the gripping portions, such that an operator is not required to lift a hand from the gripping portion in order to slow or stop the machinery. Notably, control devices described herein can allow for one-handed operation and control of the self-propelled machinery. Moreover, the gripping portions can be angled, allowing for improved comfort to an operator, easier steering of the machinery, and lower operator fatigue.

In some aspects, control device 90 can comprise a first gripping portion or a first leg, generally designated 94A, a second gripping portion or second leg, generally designated 94B, and a central portion, generally designated 96, disposed therebetween. In some aspects, first leg 94A can be spaced apart from and angled with respect to second leg 94B, improving the ergonomic and aesthetic aspects thereof. In some aspects, each of first and second leg 94A and 94B can comprise an elongated body that can be substantially cylindrical in shape and comprise a front cover and a rear cover as described in FIG. 2. Front and rear covers can be joined together in any suitable manner, such as, for example, with mechanical fasteners (not shown) seated within fastener holes. It is also envisioned in accordance with the present disclosure that first and second legs 94A and 94B can be formed as a unitary structure.

In some aspects, one or more controls can be disposed over a central portion 96 of device 90 and/or over portions of first and second legs 94A and 94B of device 90. Such controls can advantageously be centralized with respect to the operator, and easily reachable from first and second legs 94A and 94B, respectively. For example and in some aspects, central portion 96 can comprise a first pressure-sensitive or "push" control, such as a push button start 98, and a second rotatable control, such as a rotatable knob setting 100 or dial disposed thereon. In some aspects, push button start 98 and setting 100 can be disposed on a first surface or side of device 90. One or more controls can also be disposed on an opposing second surface or back side of device. In some aspects, setting 100 comprises a speed setting, whereby an operator can set a maximum speed of the self-propelled machinery via a main potentiometer.

In some aspects, push button start 98 and setting 100 can comprise electric controls configured to electrically communicate (e.g., via electrical pulses and/or electrical signals) to a centralized control unit (e.g., 54, FIG. 4) for controlling portions of a gas, electric, and/or hybrid engine to increase speed, decrease speed, set and hold (e.g., maintain) speed, and/or altogether stop forward motion of the machinery. In some aspects, electrical signals can be directly or indirectly communicated via one or more electrically conductive wires (not shown) to a control unit of the machinery. Signals carried via conductive wires (not shown) can be varied via movement affected to one or more potentiometers (FIG. 2), such as by pushing, rotating, squeezing, and/or otherwise applying pressure to one or more controls. Such variations in electrical signal can be interpreted at electric control unit (54, FIG. 4) and used to control aspects of electric transmission and/or wheels.

As FIG. 6 illustrates, in some aspects setting 100 can comprise a dial that can be rotated or moved clockwise and/or counterclockwise as indicated by directions D3 and D4 with respect to legs and central portion 96 of device 90 for setting a maximum speed. That is, a speed associated with the forward motion of the machinery can be easily controlled by manipulating or physically adjusting setting 100, which triggers a main potentiometer. In some aspects, speed of the machinery can be selectively adjusted by an operator (e.g., to a higher or lower maximum speed) simply by twisting or rotating one or more portions of speed setting 100. In some aspects, setting 100 comprises an intuitive speed setting dial, which is easy to understand and not overly complex. Notably, rotation of setting 100 can vary voltage or current supplied to control unit (FIG. 4) via a main potentiometer (not shown, see e.g., 32, FIG. 2). The main potentiometer controlled via setting 100 can be used to control aspects of an electrical transmission (e.g., a maximum power transferred to one or more wheels) by varying the voltage or resistance of an electrical current supplied to a controller, for example, via turning of a dial or knob setting (e.g., setting 100).

Still referring to FIG. 6, control device 90 can further comprise one or more other pressure sensitive settings, such as one or more trigger controls, generally designated 102. In some aspects, first and second legs 94A and 94B comprise an outer structure or housing portion 104 from which one or more trigger controls 102 can protrude. Portions of trigger controls 102 can also be disposed within housing portion 104. In some aspects, trigger controls 102 can be adapted to engage the electric transmission via communication of electric signals, thereby initiating forward propulsion of the machinery. Trigger controls 102 can also be adapted to vary the speed of one or more wheels of the machinery.

Figure 7A:
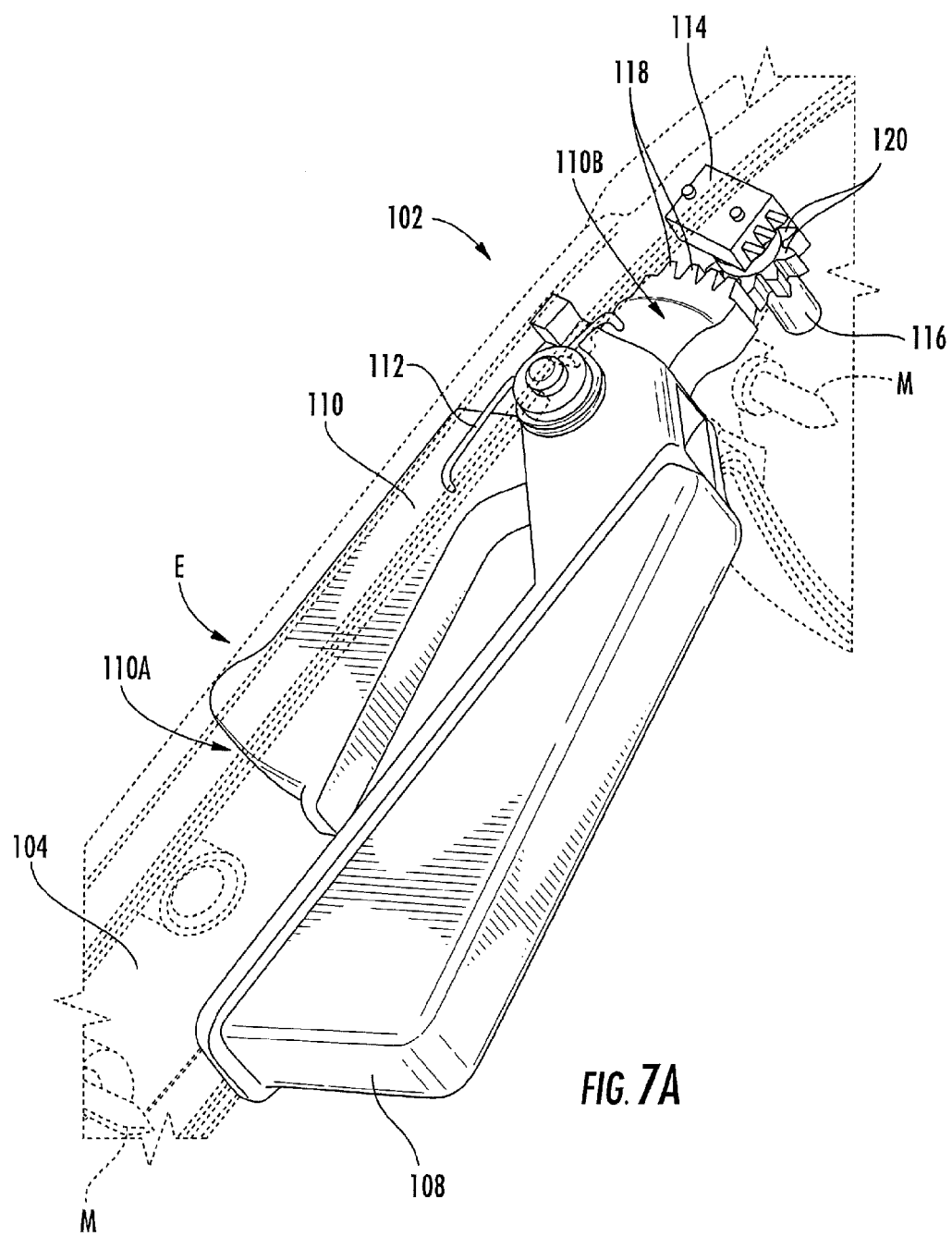
FIGS. 7A and 7B are perspective internal and external views illustrating control devices and/or portions of control systems for self-propelled machinery according to one aspect of the subject matter disclosed herein.
Figure 7B:
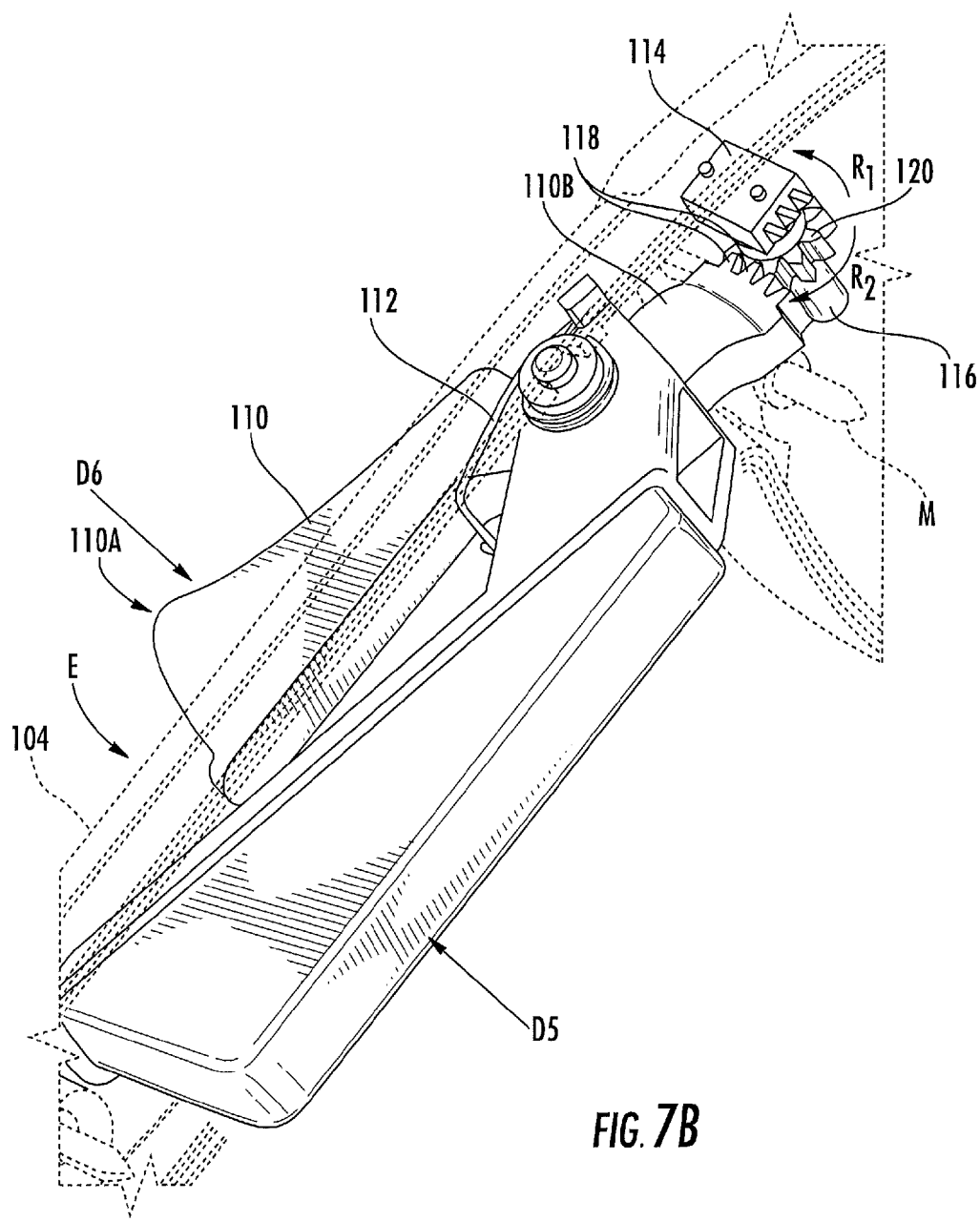

In some aspects, portions of trigger controls 102 can be movable between a drive mode that is OFF (e.g., FIG. 7A) and a drive mode that is ON (e.g., FIG. 7B). After the electric transmission of the machinery has been engaged via pressing one portion of or more trigger controls 102, a speed of the machinery can be slowed or stopped by squeezing or applying pressure to other portions of one or more trigger controls 102. In some aspects, portions of trigger controls 102 can extend or protrude from opposing sides or surfaces of gripping portions 94A and 94B, for example, from opposing first and second sides or surfaces of housing portion 104. The speed of the self-propelled machinery can be lowered from a maximum operating speed applied via setting 100. Notably, an operator can squeeze a portion of trigger control 102 while gripping a portion of leg 94A or 94B, which can decrease speed of a transmission (FIG. 4) and decrease subsequent forward movement of one or more wheels associated with the machinery. Device 90 can further comprise a lever 106, such as a brake lever previously described herein. Lever 106 can pivot about one or more pivot points P of device 90 in a pivot direction P1.

FIGS. 7A and 7B illustrate trigger control 102, and portions thereof, as it is positioned within housing portion 104 and/or is protruding therefrom. Housing portion 104 can comprise a unitary housing or one or more cover portions (e.g., FIG. 2) assembled via one or more mechanical fasteners M. FIG. 7A illustrates a position of trigger control 102 and/or portions thereof in an OFF mode, such as when the machinery is not being driven or self-propelled. FIG. 7B illustrates a position of trigger control 102 and/or portions thereof in an ON mode, such as when the machinery is driving in a forward direction and/or being self-propelled.

Referring to FIGS. 7A and 7B and in some aspects, trigger control 102 can comprise a first pressure sensitive member or a first lever 108 and a second pressure sensitive member or a second lever 110. At least a portion of first lever 108 can be connected or attached to a portion of second lever 110 via a biasing member 112. In some aspects, first lever 108 comprises a clutch lever adapted to engage the drive transmission by communicating with a controller (e.g., FIG. 4), and second lever 110 comprises a change lever adapted to slow or stop rotation of one or more wheels via communicating signals to transmission via controller. In some aspects, biasing member 112 can comprise a spring or spring assembly. As FIG. 7A illustrates and in some aspects, biasing member can be configured to bias first lever 108 such that it protrudes outward from housing portion 104 and towards the operator of the self-propelled machinery in the OFF mode. As FIG. 7A further illustrates, second lever 110 can be biased within housing portion 104 in the OFF mode, such that it does not protrude outward from and/or beyond an outer edge E of housing portion 104.

Trigger control 102 can be adapted to engage, move, or otherwise physically communicate with a portion of at least one secondary potentiometer 114. Secondary potentiometer 114 can be adapted to reduce or stop speed set via a main potentiometer (e.g., via setting 100). In some aspects, secondary potentiometer 114 can be disposed over a portion of a gear 116. In some aspects, second lever 110 can comprise a first end 110A and a second end 110B. One or more teeth or splines 118 can be provided at second end 110B of second lever 110. Teeth or splines 118 can be adapted to engage and rotate one or more corresponding teeth or splines 120 of gear 116. Notably, rotation of gear 116 via second lever 110 can movably trigger potentiometer 114 to vary a voltage or current of an electrical signal provided to a controller or electric control unit (e.g., FIG. 4) and transmission. Notably, triggering potentiometer 114 to vary aspects of an electrical signal can trim the speed of the self-propelled machine as signaled or instructed by the operator. As noted hereinabove, FIG. 7A illustrates trigger control 102 in the OFF mode, which can transition into the ON mode by pressing first portion 108 of trigger control 102 towards housing 104 to engage the transmission and drive the machine.

Referring now to FIG. 7B in the ON mode and upon being pressed in a direction D5, first lever 108 can move towards housing portion 104. In some aspects, pressing first lever 108 in direction D5 can cause a portion of first lever 108 to push against first end 110A of second lever 110. First lever 108 can be configured to eject a portion of second lever 110 from housing portion 104 upon application of pressure thereto, for example, and extend portions of second lever 110 beyond an outermost edge E of housing portion 104. In some aspects, first end 110A of second lever 110 can extend from housing portion 104 and second end 110B can remain within housing portion in the ON mode. That is, second lever 110 can remain hidden within housing portion 104 until clutch lever (e.g., first lever 108) is engaged via pressing or application of pressure thereto in direction D5.

In some aspects, application of pressure to first lever 108 in direction D5 can engage the transmission and initiate the drive mode (e.g., from an OFF to an ON mode). The transmission can then match the speed set by the main potentiometer (e.g., via setting 100). Pressure can be applied to first end 110A of second lever 110 in a direction D6 to reduce the speed set by the main potentiometer. That is, application of pressure to second lever 110 in a direction D6 can rotate potentiometer 114 incrementally in directions R1 and/or R2 via rotation of gear 116. Second end 110B of second lever 110 can rotate gear 116 via engagement of corresponding splines 118 and 120.

In some aspects, pressing second lever 110 in a direction D6 can rotate potentiometer 114 towards a zero position to lower the speed of the machinery, and ultimately terminate drive mode. In some aspects, approximately 15° rotation of second lever 110 can correspond to approximately 75° rotation of gear 116. In some aspects, application of pressure to change lever (e.g., second lever 110) in direction D6 rotates gear 116 counterclockwise a direction R1. In some aspects, application of pressure to clutch lever (e.g., first lever 108) in direction D5 rotates gear 116 clockwise a direction R2, and can increase speed back to the maximum speed set via a main potentiometer (e.g., via setting 100). Notably, control device 90 (FIG. 6) can comprise two trigger controls 102 disposed on two spaced apart and opposing gripping portions. Each trigger control 102 can operate as described in FIGS. 7A and 7B.

Notably, placement of trigger controls 102 over control device 90 can allow for one-handed operation or control over the self-propelled machinery. Such controls can be easily reached while steering the machinery, such that an operator is not required to lift a hand from gripping portion during steering. Notably, after starting the engine via push button start 98 and setting a maximum speed via setting 100, speed can be controlled via trigger controls 102 which do not require an operator to move his or her hands from gripping portions while steering. This can reduce operator fatigue and contribute to machinery that is more comfortable and use and easy to operate.

Figure 8:
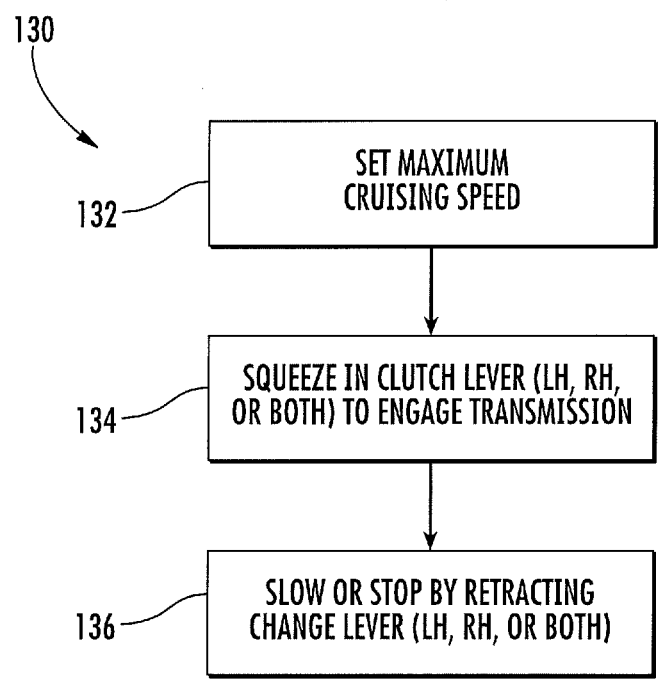
FIG. 8 is a flow chart illustrating an exemplary process for controlling self-propelled machinery via control devices and/or systems according to aspects of the subject matter described herein.

FIG. 8 is a flow chart illustrating an exemplary method, generally designated 130, for controlling aspects of self-propelled machinery via control devices and systems described hereinabove. In some aspects, the method can consist of or include a starting phase outlined via steps 72 and 74 previously described in FIG. 5. In some aspects, method 130 illustrates steps associated with a driving phase. At block 132, an operator can set a maximum cruising speed using an electric control (e.g., setting 100, FIG. 6) disposed on control device 90 (FIG. 6). In some aspects, a maximum cruising speed can be intuitively set via rotating a dial or knob (e.g. setting 100) clockwise and/or counterclockwise over control device 90 (FIG. 6). In some aspects, the maximum cruising speed can via electric signals communicated from a first (e.g., main) potentiometer to a control unit (FIG. 4).

As illustrated in block 134, the operator can apply pressure via squeezing, pressing, and/or pushing in on portions of a clutch lever (e.g., first lever 108) of one or both trigger controls (e.g., 102, FIG. 6-7B). Pressing clutch lever (e.g., first lever 108) in a direction D5 (FIG. 7B) can start or engage the electric transmission, which can initiate a drive mode (e.g., ON mode, FIG. 7B). Starting the transmission can transmit power to one or more wheels of the self-propelled machinery. The wheels can gradually propel the machinery to the maximum speed set via setting 100 (FIG. 6).

At block 136, an operator can use electric controls to slow or stop the machinery via electrically communicating the desire to slow or stop to the electric transmission. In some aspects, the one or more wheels can be slowed or stopped via retracting a change lever (e.g., second lever 110, FIG. 7B) within a housing portion (e.g., 104, FIG. 7B). That is, change lever can be squeezed, pressed, or retracted in a direction D6 (FIG. 7B) towards the operator. An electric control unit (FIG. 4) can receive signals from trigger controls via one or more potentiometers (114, FIG. 7B) associated with each trigger control, and can incrementally increase or decrease speed a given amount upon interpretation of signals from potentiometer(s).

Aspects of the subject matter disclosed herein may provide one or more of the following beneficial technical effects: improved control of self-propelled machinery; easy speed change in self-propelled machinery; improved ease-of operation of self-propelled machinery; easy to turn machinery; easy to start machinery; intuitive controls; improved comfort during operation of self-propelled machinery; low operator fatigue; attractive size and/or shape of control device; ergonomic, easy to understand and comfortable controls; easy to manipulate trigger controls; easy, one-handed operation of machinery.

While the present subject matter has been has been described herein in reference to specific aspects, features, and illustrative embodiments, it will be appreciated that the utility of the invention is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, aspects, modifications and alternative embodiments, within its scope and including equivalents of the claims.

What is claimed is:

1. A control device for self-propelled machinery, the control device comprising:
    a central portion disposed between a first gripping portion and a second gripping portion, wherein the central portion has only a first electric control and a second electric control disposed thereon, wherein one of the first and second electric controls is a push button control and another of the first and second electric controls is a rotatable control; and
    a first pressure sensitive trigger control provided on the first gripping portion and a second pressure sensitive trigger control provided on the second gripping portion;
    wherein each trigger control is configured to reduce a speed of the entire self-propelled machinery by actuating at least one potentiometer for varying an electrical signal carried by the control device, thereby stopping and/or slowing the entire self-propelled machinery upon actuation of a single one of the first or second pressure sensitive trigger controls.

2. The device of claim 1, wherein each trigger control is disposed over a rear surface of the respective gripping portion.

3. The device of claim 1, wherein the push button control comprises a push button start provided over the central portion.

4. The device of claim 1, wherein the rotatable control is a rotatable knob setting provided over the central portion, wherein the knob setting is configured to set a maximum speed via a second potentiometer.

5. The device of claim 1, wherein:
    the first gripping portion is elongated along a first axis and the second gripping portion is elongated along a second axis,
    the first axis is angled with respect to the second axis, and
    the first and second axes are substantially coplanar with a plane defined by a width and a height of the central portion.

6. The device of claim 1, wherein the first and second trigger controls comprise multiple levers.

7. The device of claim 6, wherein the multiple levers comprise a first lever adapted to engage an electric transmission and a second lever adapted to slow or stop the electric transmission.

8. The device of claim 1, wherein each trigger control is disposed over a front surface of the respective gripping portion.

9. The device of claim 1, further comprising a pivotal brake lever.

10. A control system for self-propelled machinery, the system comprising:
   a control device comprising a central portion having only a first electric control and a second electric control disposed thereon, wherein one of the first and second electric controls is a push button control and another of the first and second electric controls is a rotatable control;
   a first gripping portion and a second gripping portion extending from the central portion, wherein a first pressure sensitive trigger control is provided on the first gripping portion and a second pressure sensitive trigger control is provided on the second gripping portion, whereby application of pressure to either or both of the first and second trigger controls actuates movement within a potentiometer for modifying an electrical signal carried by the device; and
   a control unit in electrical communication with the control device, wherein the control unit is adapted to receive the modified electrical signal and engage an electric transmission upon receiving the modified electrical signal from the control device,
   wherein the modified electrical signal slows and/or stops an entirety of the self-propelled machinery upon actuation of a single one of the first or second pressure sensitive trigger controls.

11. The system of claim 10, wherein each trigger control is disposed over a front surface of the respective gripping portion.

12. The system of claim 10, wherein each trigger control is disposed over a rear surface of the respective gripping portion.

13. The system of claim 10, wherein the potentiometer is provided over a portion of a movable gear.

14. The system of claim 10, wherein the push button control comprises a push button start provided over a central portion of the device.

15. The system of claim 10, wherein the rotatable control comprises a rotatable knob setting provided over a central portion of the device.

16. The system of claim 15, wherein the knob setting is configured to set a maximum speed via actuating movement within a second potentiometer.

17. A control system for self-propelled machinery, the system comprising:
   a control device comprising:
      a handle comprising a first gripping portion, a second gripping portion, and
      a central portion disposed therebetween;
      only a first electric control and a second electric control disposed on the central portion, wherein at least one of the first and second electric controls comprises a rotatable control and at least one of the first and second electric controls comprises a push button control, whereby rotation of the rotatable control actuates a first potentiometer disposed in the central portion for setting a maximum speed via communication of a first electrical signal; and
      at least one pressure sensitive trigger control disposed on the first gripping portion or the second gripping portion, whereby application of pressure to the trigger control actuates movement within a second potentiometer for slowing or stopping movement of the entire self-propelled machinery via communication of a second electrical signal; and
   a control unit in electrical communication with the control device, wherein the control unit is adapted to receive the first and second electrical signals and control an electric transmission in response to receiving the first and second electrical signals.

18. The system according to claim 17, further comprising a brake lever configured to attach to a portion of the control device.

19. The system according to claim 17, further comprising at least two pressure sensitive trigger controls.

20. A lawnmower incorporating the control system of claim 17.

* * * * *